United States Patent
Tanaka et al.

(10) Patent No.: US 9,986,131 B2
(45) Date of Patent: May 29, 2018

(54) IMAGE PROCESSING SYSTEM, IMAGE OUTPUT APPARATUS, AND A TERMINAL, INCLUDING AN OUTPUT METHOD, AND NON-TRANSITORY RECORDING MEDIUM STORING COMPUTER READABLE PROGRAM FOR CAUSING THE TERMINAL WORN BY A USER TO OBTAIN A PHYSICAL FEATURE OF THE USER

(71) Applicant: Konica Minolta, Inc., Chiyoda-ku, Tokyo (JP)

(72) Inventors: Yuji Tanaka, Amagasaki (JP); Junichi Hase, Osaka (JP); Takeshi Minami, Amagasaki (JP); Tomoaki Nakajima, Kobe (JP); Nobuhiro Mishima, Osaka (JP); Akihiro Torigoshi, Itami (JP); Daisuke Nakano, Kobe (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days. days.

(21) Appl. No.: 15/364,868

(22) Filed: Nov. 30, 2016

(65) Prior Publication Data
US 2017/0171430 A1   Jun. 15, 2017

(30) Foreign Application Priority Data
Dec. 10, 2015 (JP) ................. 2015-241364

(51) Int. Cl.
G06K 15/00  (2006.01)
H04N 1/44   (2006.01)
H04N 1/00   (2006.01)

(52) U.S. Cl.
CPC ......... *H04N 1/442* (2013.01); *H04N 1/00204* (2013.01); *H04N 1/00307* (2013.01);
(Continued)

(58) Field of Classification Search
None
See application file for complete search history.

(56) References Cited

U.S. PATENT DOCUMENTS

2007/0177185 A1* 8/2007 Ogura .................. G06F 3/1208
                                                       358/1.14
2013/0050736 A1   2/2013 Akahira et al.
(Continued)

FOREIGN PATENT DOCUMENTS

JP   2003-036245 A   2/2003
JP   2003-093368 A   2/2003
(Continued)

OTHER PUBLICATIONS

Notification of Reasons for Refusal dated Feb. 8, 2018, in corresponding Japanese Patent Application No. 2015-241364, and a partial English translation thereof.

*Primary Examiner* — Marcellus Augustin
(74) *Attorney, Agent, or Firm* — Buchanan Ingersoll & Rooney PC

(57) ABSTRACT

An image processing system includes a terminal worn by a user for use; and an image output apparatus configured to perform an output process for outputting an image in accordance with a command given by the user. The terminal includes an obtaining portion configured to obtain, from the user, a physical feature of the user. Any one or both of the terminal and the image output apparatus includes an authentication portion configured to perform, prior to the output process, an authentication process for verifying the user based on the physical feature obtained by the obtaining portion. The image output apparatus includes an output process portion configured to perform the output process when the authentication portion verifies the user.

14 Claims, 13 Drawing Sheets

(52) U.S. Cl.
CPC ... *H04N 1/4433* (2013.01); *H04N 2201/0039* (2013.01); *H04N 2201/0044* (2013.01); *H04N 2201/0055* (2013.01); *H04N 2201/0094* (2013.01)

(56) References Cited

U.S. PATENT DOCUMENTS

| | | | |
|---|---|---|---|
| 2013/0070924 A1* | 3/2013 | Bertin | H04N 13/0497 380/211 |
| 2015/0181368 A1 | 6/2015 | Okabayashi | |
| 2015/0234624 A1* | 8/2015 | Nii | G06F 3/1238 358/1.14 |
| 2015/0277806 A1* | 10/2015 | Shibata | G06F 3/1203 358/1.14 |
| 2016/0012292 A1* | 1/2016 | Perna | G06K 9/00604 382/117 |
| 2017/0039010 A1* | 2/2017 | Nobutani | G06F 3/1222 |
| 2017/0279994 A1* | 9/2017 | Oshima | G06F 3/1222 |

FOREIGN PATENT DOCUMENTS

| | | |
|---|---|---|
| JP | 2010-183306 A | 8/2010 |
| JP | 2012-058902 A | 3/2012 |
| JP | 2013-045315 A | 3/2012 |
| JP | 2014-219784 A | 11/2014 |
| JP | 2015-121840 A | 7/2015 |

* cited by examiner

FIG. 3

| ENTER USER CODE AND PASSWORD. | 2009/09/25 C☐ |
| | 12:34 M☐ |
| | Y☐ |
| | K☐ |

USER CODE: ☐

PASSWORD: ☐

LOG IN

61

IMAGE PROCESSING SYSTEM, IMAGE OUTPUT APPARATUS, AND A TERMINAL, INCLUDING AN OUTPUT METHOD, AND NON-TRANSITORY RECORDING MEDIUM STORING COMPUTER READABLE PROGRAM FOR CAUSING THE TERMINAL WORN BY A USER TO OBTAIN A PHYSICAL FEATURE OF THE USER

The present U.S. patent application claims a priority under the Paris Convention of Japanese patent application No. 2015-241364 filed on Dec. 10, 2015, the entirety of which is incorporated herein by reference.

BACKGROUND OF THE INVENTION

1. Field of the Invention

The present invention relates to an apparatus for performing processing of outputting an image, e.g., an MFP, a method for controlling the apparatus, and so on.

2. Description of the Related Art

Recent years have seen the widespread use of image forming apparatuses which have different functions of copying, scanning, faxing, and document server. Such an image forming apparatus is generally called a "multifunction device" or a "Multi-Functional Peripheral (MFP)".

The image forming apparatus is installed in a corporation, a government office, or a school, and is shared by users. Confidential information is sometimes handled by the image forming apparatus.

With this being the situation, according to conventional technologies, the image forming apparatus is locked, and only a user who is allowed to log into the image forming apparatus is given a permission to use the same.

In order for the user to log into the image forming apparatus, the user operates a touch-sensitive panel display of the image forming apparatus to enter his/her user code and password. Alternatively, the user causes a card reader of the image forming apparatus to read a card where his/her user code is recorded to enter his/her user code.

The image forming apparatus verifies the user code and so on entered by the user. When the user verification is successful, the user is permitted to log into the image forming apparatus. This enables the user to use the image forming apparatus.

The user sometimes moves from the installation site of the image forming apparatus temporarily before work by the image forming apparatus is completely finished. In such a case, leaving the image forming apparatus available to anybody is not preferable for security reasons.

In view of this, some technologies have been proposed. According to one of the conventional technologies, a CPU authenticates a user corresponding to an input user ID and password of the user by comparing the input user ID and password of the user with user information including user IDs and passwords of respective users. The CPU detects that an authenticated user has left an image forming device on the basis of detection signals by a human sensor, and when detecting that the authenticated user has left the image forming device, cancels an authentication state of the authenticated user. (English Abstract of Japanese Unexamined Patent Application Publication No. 2013-045315).

According to another one of the conventional technologies, reauthentication necessity information, which represents whether or not reauthentication is needed in printing, is prepared in list information of print data, and if the print data selected by a user needs reauthentication, the reauthentication is requested from the user who logs in the printer (English Abstract of Japanese Unexamined Patent Application Publication No. 2012-058902).

The conventional technologies can improve the security. For the improvement in security, however, it is necessary to increase the number of times of authentication to be performed.

This increases the number of times of operation by a user, which affects the user-friendliness of the image forming apparatus.

SUMMARY

The present invention has been achieved in light of such an issue, and therefore, an object of an embodiment of the present invention is to maintain the security of an image forming apparatus and to improve the user-friendliness of the image forming apparatus as compared to conventional technologies.

To achieve at least one of the objects mentioned above, according to an aspect, an image processing system includes a terminal worn by a user for use; and an image output apparatus configured to perform an output process for outputting an image in accordance with a command given by the user; wherein the terminal includes an obtaining portion configured to obtain, from the user, a physical feature of the user, any one or both of the terminal and the image output apparatus includes an authentication portion configured to perform, prior to the output process, an authentication process for verifying the user based on the physical feature obtained by the obtaining portion, and the image output apparatus includes an output process portion configured to perform the output process when the authentication portion verifies the user.

Preferably, the image output apparatus includes a login process portion configure to permit the user to log into the image output apparatus when the authentication portion verifies the user, and a display portion configured to display, when the user logs in the image output apparatus, a screen for the user to designate conditions for the output process, and the output process portion performs the output process based on the conditions designated by the user in the screen.

BRIEF DESCRIPTION OF THE DRAWINGS

The above and other objects, advantages, and features of the present invention will become more fully understood from the detailed description given hereinbelow and the appended drawings which are given by way of illustration only, and thus are not intended as a definition of the limits of the present invention, and wherein:

FIG. 3 is a diagram showing an example of a login screen;

DESCRIPTION OF THE PREFERRED EMBODIMENTS

Hereinafter, an embodiment of the present will be described with reference to the drawings. However, the scope of the invention is not limited to the illustrated examples.

Figure 1:
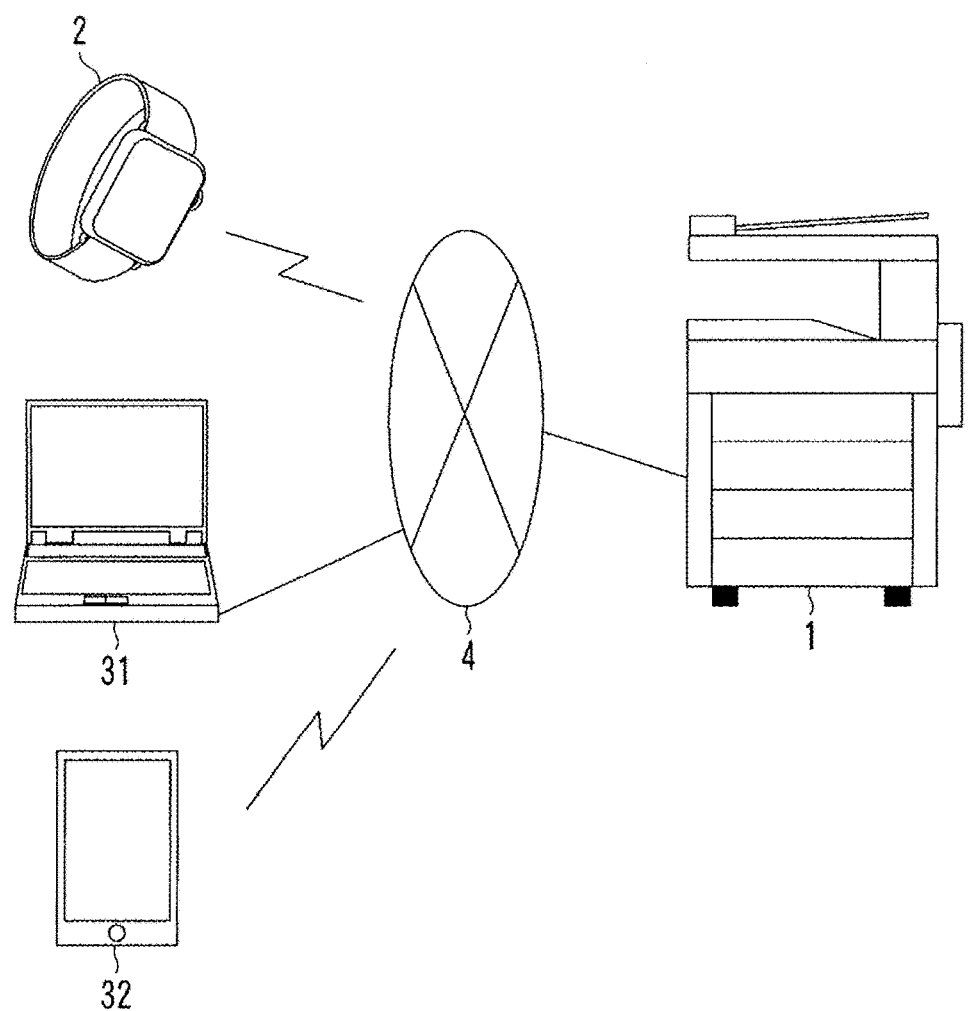
FIG. 1 is a diagram showing an example of the overall configuration of an image processing system.
Figure 2:
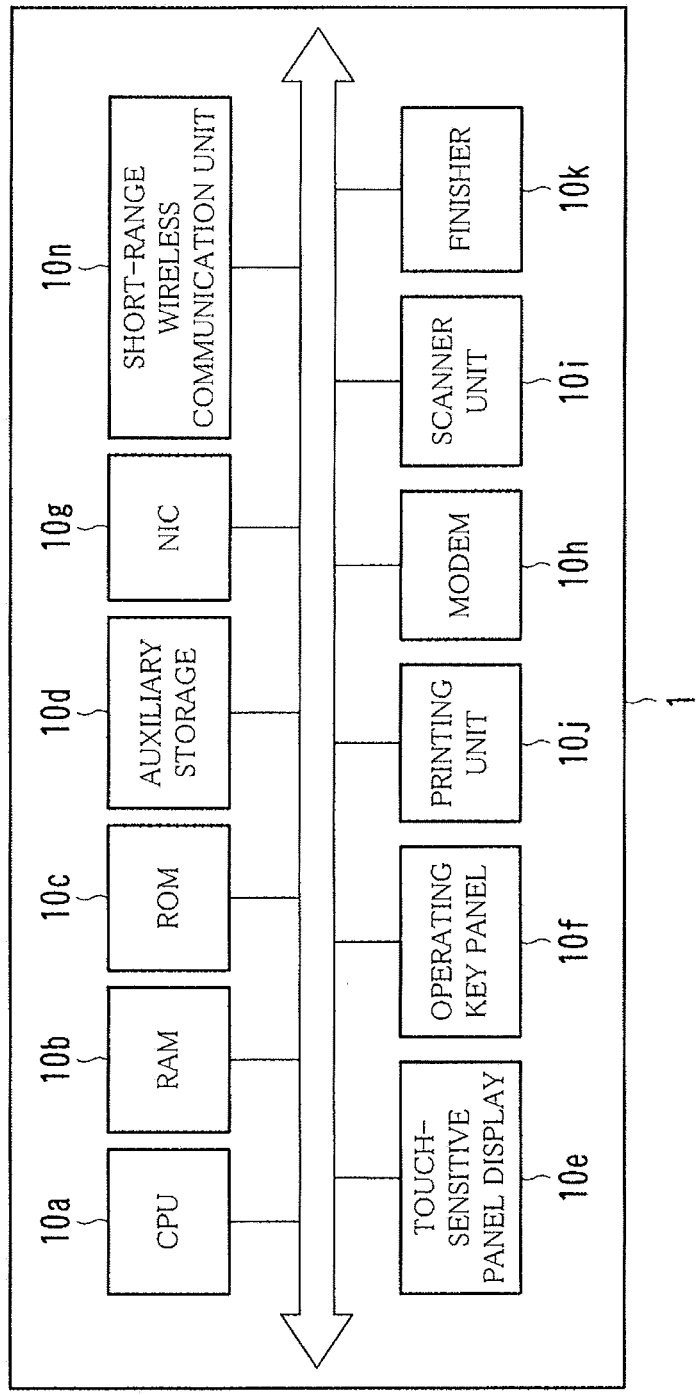
FIG. 2 is a diagram showing an example of the hardware configuration of an image forming apparatus.
Figure 4:
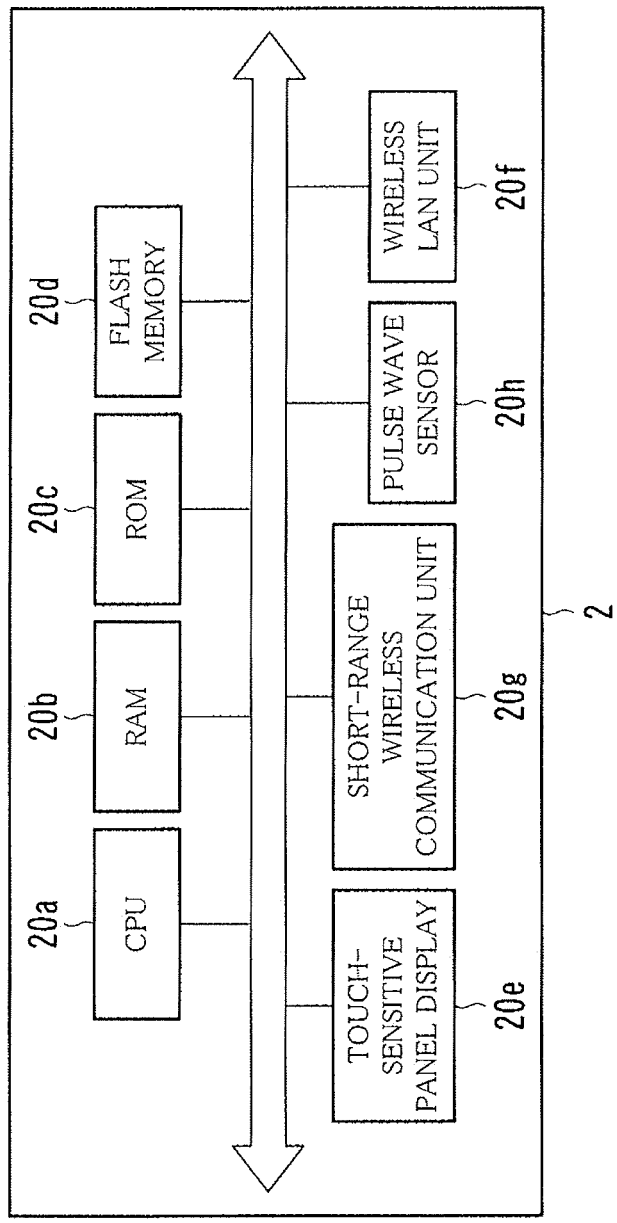
FIG. 4 is a diagram showing an example of the hardware configuration of a wearable terminal.
Figure 5:
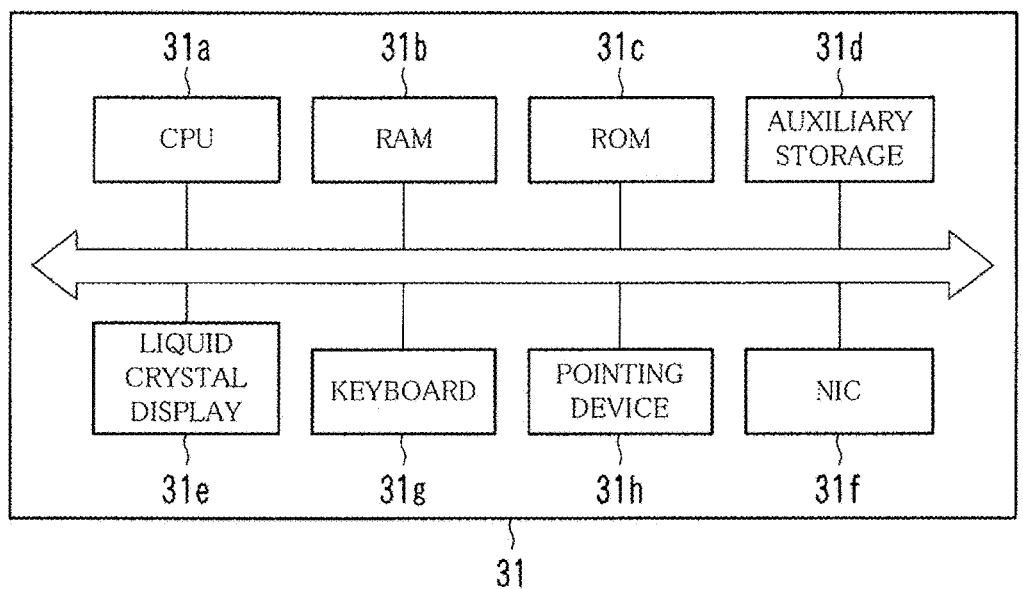
FIG. 5 is a diagram showing an example of the hardware configuration of a personal computer.
Figure 6:
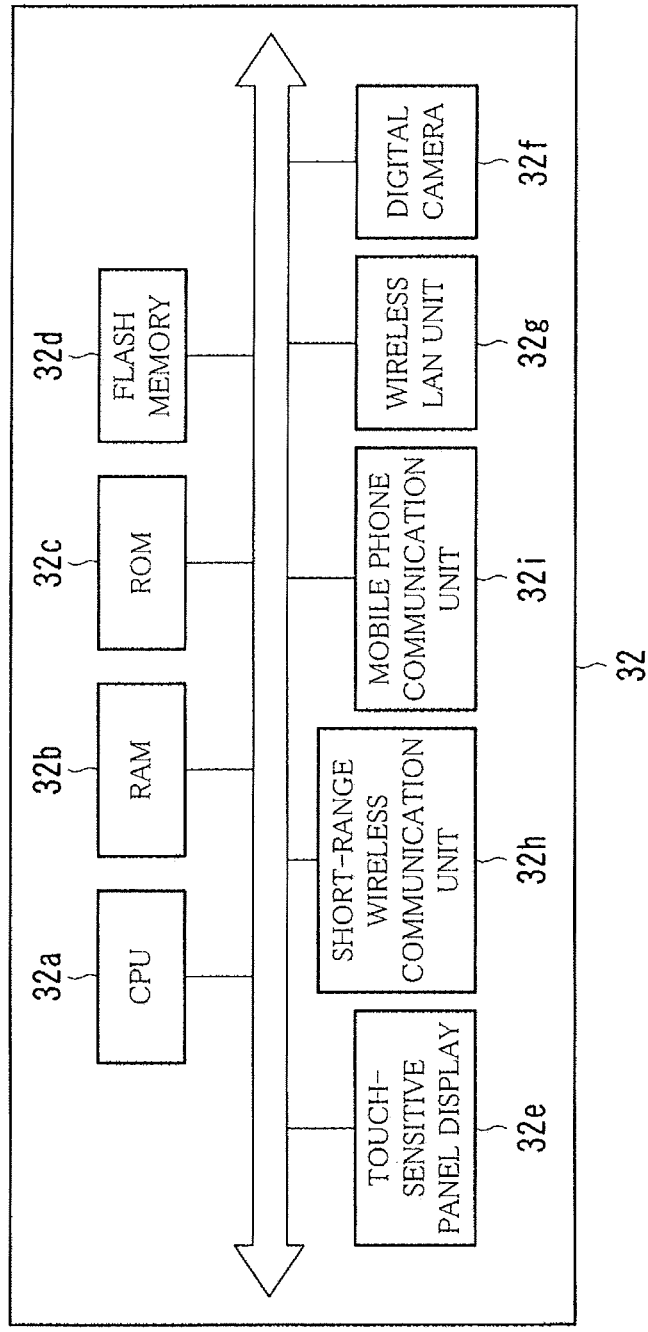
FIG. 6 is a diagram showing an example of the hardware configuration of a smart phone.

FIG. 1 is a diagram showing an example of the overall configuration of an image processing system 100. FIG. 2 is a diagram showing an example of the hardware configuration of an image forming apparatus 1. FIG. 3 is a diagram showing an example of a login screen 61. FIG. 4 is a diagram showing an example of the hardware configuration of a wearable terminal 2. FIG. 5 is a diagram showing an example of the hardware configuration of a personal computer 31. FIG. 6 is a diagram showing an example of the hardware configuration of a smart phone 32.

As shown in FIG. 1, the image processing system 100 is configured of the image forming apparatus 1, the wearable terminal 2, the personal computer 31, the smart phone 32, a communication line 4, and so on.

The image processing system 100 enables a user to duplicate (make a copy of) an image recorded on a paper sheet in another sheet or to store the image in digitized form.

The image processing system 100 is installed in an organization such as a corporation, a government office, or a school, and is shared by members of the organization. Each member, namely, each user, is given a unique identification code as a user code.

The image forming apparatus 1, the wearable terminal 2, the personal computer 31, and the smart phone 32 are configured to perform communication with one another via the communication line 4. Examples of the communication line 4 are a Local Area Network (LAN), a short-range radio network, the Internet, a public circuit, and a dedicated line.

The image forming apparatus 1 is an apparatus into which functions such as copying, network printing, faxing, scanning, and a box function are incorporated. The image forming apparatus 1 is generally called a "multifunction device" or a "Multi-Functional Peripheral (MFP)".

The network printing function is to print an image onto paper based on image data received from the personal computer 31. The network printing function is also called "network print" or "PC print" in some cases.

According to the box function, each user is given a storage area called a "box" or a "personal box". The box function enables each user to save image data to his/her storage area and to manage the image data therein. The box corresponds to a "folder" or a "directory" in a personal computer.

Referring to FIG. 2, the image forming apparatus 1 is configured of a Central Processing Unit (CPU) 10a, a Random Access Memory (RAM) 10b, a Read Only Memory (ROM) 10c, an auxiliary storage 10d, a touch-sensitive panel display 10e, an operating key panel 10f, a Network Interface Card (NIC) 10g, a modem 10h, a scanner unit 10i, a printing unit 10j, a finisher 10k, a short-range wireless communication unit 10n, and so on.

The touch-sensitive panel display 10e displays, for example, a screen for presenting messages to the user, a screen for allowing the user to enter commands or information, a screen for showing the results of processing executed by the CPU 10a. The touch-sensitive panel display 10e also sends a signal indicating a touched location to the CPU 10a.

The operating key panel 10f is a so-called hardware keyboard. The operating key panel 10f is provided with numeric keys, a start key, a stop key, and function keys.

The user needs to log into the image forming apparatus 1 in order to give a job thereto or change settings by operating the touch-sensitive panel display 10e and the operating key panel 10f. The login screen 61 as shown in FIG. 3 is displayed in the touch-sensitive panel display 10e while no one logs in the image forming apparatus 1.

The NIC 10g performs communication with the wearable terminal 2, the personal computer 31, and the smart phone 32 in accordance with a protocol such as Transmission Control Protocol/Internet Protocol (TCP/IP).

The modem 10h sends and receives image data with a fax terminal in accordance with a protocol such as G3.

The scanner unit 10i optically reads an image recorded on a sheet placed on a platen glass to generate image data thereof.

The printing unit 10j prints, onto paper, the image captured by the scanner unit 10i. The printing unit 10j also prints, onto paper, an image based on data sent by the wearable terminal 2 and received by the NIC 10g. The printing unit 10j also prints, onto paper, an image based on data sent by a fax terminal and received by the modem 10h.

The finisher 10k applies a finish to paper onto which a document has been printed by the printing unit 10j, namely, to a printed matter. The finish is, for example, to staple the printed matter with a stapler, to punch a hole in the printed matter, or to fold the printed matter.

The short-range wireless communication unit 10n is configured to establish communication using radio waves which can travel few meters to a dozen meters. The radio field intensity may be so reduced that a signal outputted from the short-range wireless communication unit 10n can be delivered only to a range within two meters or so. Examples of the short-range wireless communication unit 10n include devices conforming to the standards of Bluetooth (registered trademark) or the standards of wireless Universal Serial Bus (USB). The following description takes an example where the short-range wireless communication unit 10n is a device conforming to the standards of Bluetooth.

The short-range wireless communication unit 10n uses beacon technology. According to the beacon technology, the short-range wireless communication unit 10n picks up a radio beacon (radio marker) emitted by another Bluetooth-compatible device to gauge a distance between that device and the subject short-range wireless communication unit 10n or to determine a positional relationship therebetween. According to the beacon technology, the short-range wireless communication unit 10n also sends out a radio marker thereof.

The ROM 10c or the auxiliary storage 10d stores, therein, a program for implementing the foregoing functions. The ROM 10c or the auxiliary storage 10d also stores a wearable login program 10P1 and a job management program 10P2 (FIG. 7) therein.

The programs are loaded into the RAM 10b as necessary and are executed by the CPU 10a. The auxiliary storage 10d is, for example, a hard disk drive or a Solid State Drive (SSD).

The wearable terminal 2 is a computer that the user wears for use. The wearable terminal 2 is, for example, a wristwatch-type terminal or a glasses-type terminal. The following description provides an example in which the wearable terminal 2 is a wristwatch-type terminal. The wristwatch-type wearable terminal is, for example, Apple Watch developed by Apple Inc.

Referring to FIG. 4, the wearable terminal 2 is configured of a CPU 20a, a RAM 20b, a ROM 20c, a flash memory 20d, a touch-sensitive panel display 20e, a wireless LAN unit 20f, a short-range wireless communication unit 20g, a pulse wave sensor 20h, and so on.

The touch-sensitive panel display 20e displays, for example, a screen for presenting messages to the user, a screen for allowing the user to enter commands or information, a screen for showing the results of processing executed by the CPU 20a. The touch-sensitive panel display 20e also sends a signal indicating a touched location to the CPU 20a.

The wireless LAN unit 20f is a Wi-Fi compatible communication device. The wireless LAN unit 20f performs communication with the image forming apparatus 1, the personal computer 31, the smart phone 32, and so on in accordance with a protocol such as TCP/IP.

The short-range wireless communication unit 20g establishes communication using radio waves in accordance with standards similar to those (Bluetooth in this embodiment) for the short-range wireless communication unit 10n of the image forming apparatus 1. As with the short-range wireless communication unit 10n of the image forming apparatus 1, the short-range wireless communication unit 20g uses the beacon technology. According to the beacon technology, the short-range wireless communication unit 20g sends out a radio marker thereof, and picks up a radio marker emitted by another Bluetooth-compatible device to gauge a distance between that device and the subject short-range wireless communication unit 20g or to determine a positional relationship therebetween.

The pulse wave sensor 20h measures user's pulse wave to analyze the feature of the pulse wave. The pulse wave thus measured and the feature thereof are used for user authentication processing.

Figure 7:
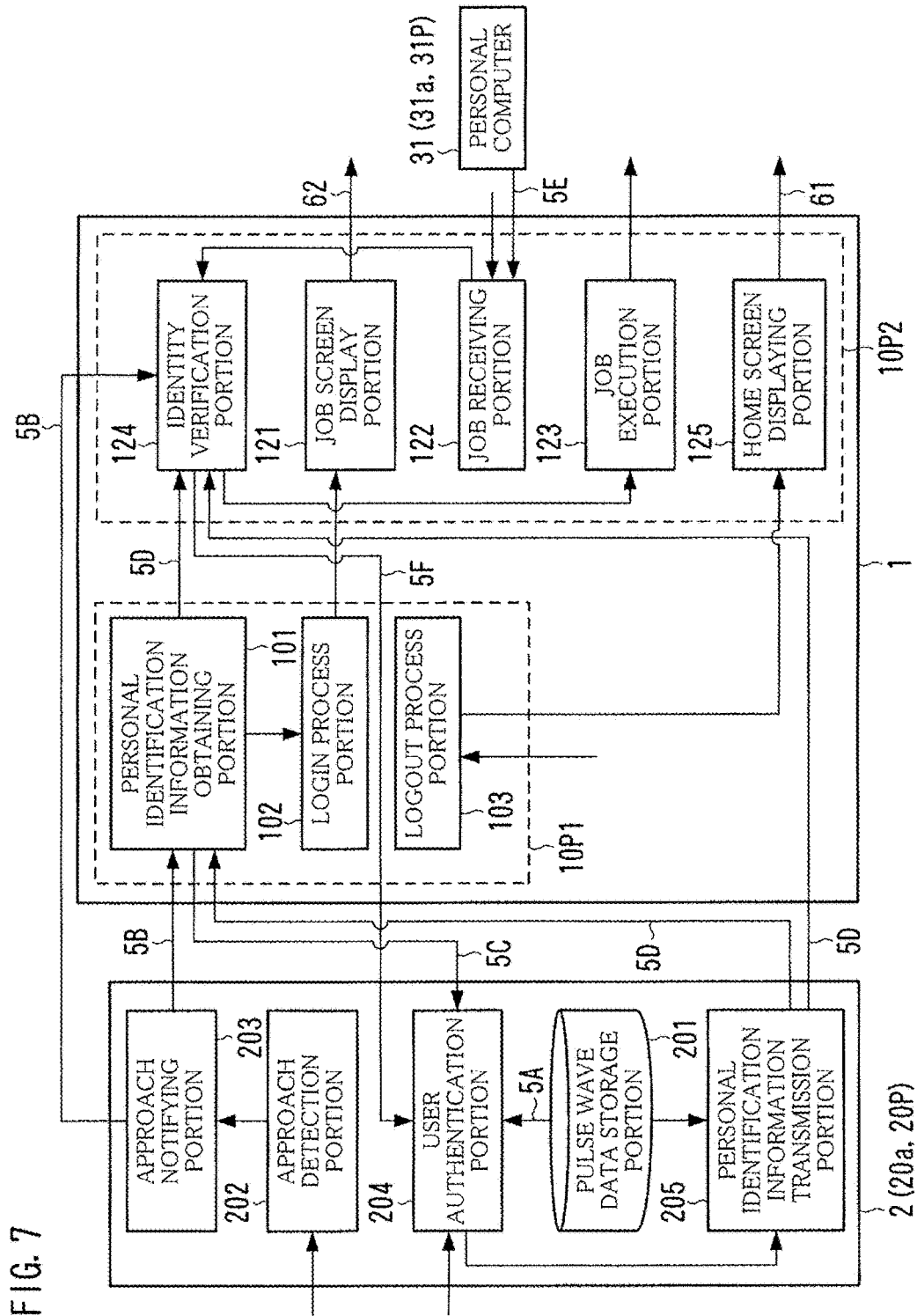
FIG. 7 is a diagram showing an example of the functional configuration of an image forming apparatus and the functional configuration of a wearable terminal.

The ROM 20c and the flash memory 20d store, therein, an operating system, an application, and a user authentication program 20P (FIG. 7).

The programs are loaded into the RAM 20b as necessary and are executed by the CPU 20a.

Referring to FIG. 5, the personal computer 31 is configured of a CPU 31a, a RAM 31b, a ROM 31c, an auxiliary storage 31d, a liquid crystal display 31e, an NIC 31f, a keyboard 31g, a pointing device 31h, and so on.

The liquid crystal display 31e displays, for example, a document to be printed and a screen used for giving a print command.

The NIC 31f performs communication with the image forming apparatus 1 and so on in accordance with a protocol such as TCP/IP.

The keyboard 31g and the pointing device 31h are devices with which the user enters information and commands.

The ROM 31c or the auxiliary storage 31d stores, therein, an operating system, different applications, and a printer driver 31P (FIG. 7). The printer driver 31P is a program based on which the image forming apparatus 1 is caused to execute a network print job. The network print job is to print, onto paper, a document of which data is prepared in the personal computer 31.

The programs are loaded into the RAM 31b as necessary and are executed by the CPU 31a. The auxiliary storage 31d is, for example, a hard disk drive or an SSD.

Referring to FIG. 6, the smart phone 32 is configured of a CPU 32a, a RAM 32b, a ROM 32c, a flash memory 32d, a touch-sensitive panel display 32e, a digital camera 32f, a wireless LAN unit 32g, a short-range wireless communication unit 32h, a mobile phone communication unit 32i, and so on.

The touch-sensitive panel display 32e displays, for example, a screen for presenting messages to the user, a screen for allowing the user to enter commands or information, a screen for showing the results of processing executed by the CPU 32a. The touch-sensitive panel display 32e also sends a signal indicating a touched location to the CPU 32a. The digital camera 32f photographs an image to generate electronic data thereof.

The wireless LAN unit 32g is a Wi-Fi compatible communication device. The wireless LAN unit 32g performs communication with the image forming apparatus 1, the wearable terminal 2, the personal computer 31, and so on in accordance with a protocol such as TCP/IP.

The short-range wireless communication unit 32h establishes communication using radio waves in accordance with standards similar to those (Bluetooth in this embodiment) for the short-range wireless communication unit 10n of the image forming apparatus 1. As with the short-range wireless communication unit 10n of the image forming apparatus 1 and so on, the short-range wireless communication unit 32h uses the beacon technology. According to the beacon technology, the short-range wireless communication unit 32h sends out a radio marker thereof, and picks up a radio marker emitted by another Bluetooth-compatible device to gauge a distance between that device and the subject short-range wireless communication unit 32h or to determine a positional relationship therebetween.

The mobile phone communication unit 32i performs communication via a mobile phone network such as Long Term Evolution (LTE).

The ROM 32c and the flash memory 32d store, therein, an operating system, an application, and a program for relaying data to be sent/received between the image forming apparatus 1 and the wearable terminal 2.

The programs are loaded into the RAM 32b as necessary and are executed by the CPU 32a.

In the meantime, before execution of a specific type of job, the image forming apparatus 1 checks whether or not a user who wears the wearable terminal 2 on his/her arm and operates the image forming apparatus 1 is the same person as the user who has given a command to execute the specific type of job. At this time, the image forming apparatus 1 requests, at least once, information for identifying the former user. Such information is hereinafter referred to as "personal identification information".

As long as the user wears the wearable terminal 2, he/she can give personal identification information to the image forming apparatus 1 without any operation. The mechanism thereof is described below.

Figure 8:
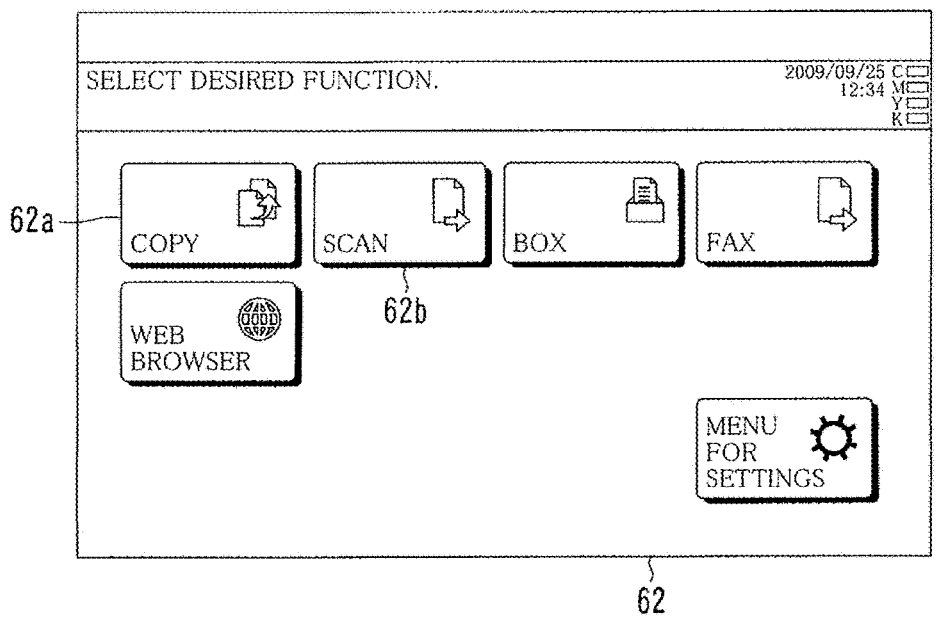
FIG. 8 is a diagram showing an example of a menu screen.

FIG. 7 is a diagram showing an example of the functional configuration of the image forming apparatus 1 and the functional configuration of the wearable terminal 2. FIG. 8 is a diagram showing an example of a menu screen 62.

The wearable login program 10P1 implements, in the image forming apparatus 1, the functions of a personal identification information obtaining portion 101, a login process portion 102, a logout process portion 103, and so on, all of which are shown in FIG. 7.

The job management program 10P2 implements, in the image forming apparatus 1, the functions of a job screen display portion 121, a job receiving portion 122, a job execution portion 123, an identity verification portion 124, a home screen displaying portion 125, and so on.

The user authentication program 20P implements, in the wearable terminal 2, a pulse wave data storage portion 201, an approach detection portion 202, an approach notifying portion 203, a user authentication portion 204, a personal identification information transmission portion 205, and so on.

With the wearable terminal 2, the pulse wave data storage portion 201 stores, in advance, pulse wave data 5A which indicates the feature of a pulse wave of an owner of the wearable terminal 2 together with a user code of the owner.

When a user becomes the owner of the wearable terminal 2, the user puts the same on his/her arm. The pulse wave sensor 20h measures his/her pulse wave to analyze the same by using a conventional method, so that the pulse wave data 5A can be obtained.

The approach detection portion 202 detects the approach of the subject wearable terminal 2 to the image forming apparatus 1, for example, in the following manner.

Every time the short-range wireless communication unit 20g picks up a radio marker, the approach detection portion 202 obtains the radio marker from the short-range wireless communication unit 20g. The approach detection portion 202 determines whether or not the radio marker is sent out by the short-range wireless communication unit 10n of the image forming apparatus 1. If the determination is positive, then the approach detection portion 202 determines that the wearable terminal 2 approaches the image forming apparatus 1.

After that, the short-range wireless communication unit 20g picks up radio markers continuously from the short-range wireless communication unit 10n. Where the radio markers are picked up continuously, the approach detection portion 202 detects, preferably only once, the approach to the image forming apparatus 1. After the continuous pick-up of the radio markers is finished, and the radio marker is received again, the approach detection portion 202 detects the approach to the image forming apparatus 1.

In order to prevent unnecessary detection which is caused by simply passing near the image forming apparatus 1 by the user of the wearable terminal 2, the following arrangement is possible. To be specific, the approach detection portion 202 detects the approach of the subject wearable terminal 2 to the image forming apparatus 1 when the radio marker is continuously received during a predetermined period of time (5 through 10 seconds, for example).

Alternatively, according to the beacon technology, it is possible to gauge the distance between the wearable terminal 2 and the image forming apparatus 1 and to determine a positional relationship therebetween. In view of this, the approach detection portion 202 may detect the approach to the image forming apparatus 1 when the distance between the wearable terminal 2 and the image forming apparatus 1 reaches a predetermined value (2 meters, for example) or smaller. Alternatively, the approach detection portion 202 may detect the approach to the image forming apparatus 1 when the distance between the wearable terminal 2 and the image forming apparatus 1 reaches the predetermined value and when the wearable terminal 2 comes to the front of the image forming apparatus 1.

When the approach detection portion 202 detects the approach of the wearable terminal 2 to the image forming apparatus 1, the approach notifying portion 203 sends approach notification data 5B indicating the fact to the image forming apparatus 1.

With the image forming apparatus 1, in response to the approach notification data 5B sent from the wearable terminal 2, the personal identification information obtaining portion 101 attempts to obtain personal identification information from the wearable terminal 2. At this time, the personal identification information obtaining portion 101 sends first request data 5C to the wearable terminal 2.

With the wearable terminal 2, when the first request data 5C is sent from the image forming apparatus 1, the user authentication portion 204 and the personal identification information transmission portion 205 perform processing for providing the personal identification information to the image forming apparatus 1 in the following manner.

The user authentication portion 204 checks whether or not the user currently using the wearable terminal 2 (hereinafter, referred to as a "current user") is the same person as an owner of the wearable terminal 2. In short, the user authentication portion 204 performs user authentication. The steps for user authentication are discussed below.

The user authentication portion 204 causes the pulse wave sensor 20h to perform processing for measuring a pulse wave of the current user to analyze the feature of the pulse wave. Thereby, the feature of the pulse wave of the current user is obtained. The user authentication portion 204 then obtains the pulse wave data 5A from the pulse wave data storage portion 201.

The user authentication portion 204 checks the feature of the pulse wave obtained this time against the feature of the pulse wave indicated in the pulse wave data 5A to determine whether or not the current user is the same person as the owner of the wearable terminal 2. To be specific, if common points therebetween are found to be a predetermined amount or greater, then the user authentication portion 204 verifies that the current user is the owner of the wearable terminal 2. Otherwise, the user authentication portion 204 determines that the current user is not the owner thereof. Another arrangement is also possible. To be specific, if a difference between the feature of the pulse wave obtained against the feature of the pulse wave indicated in the pulse wave data 5A is found to be a predetermined amount or smaller, then the user authentication portion 204 verifies that the current user is the owner of the wearable terminal 2. Otherwise, the user authentication portion 204 determines that the current user is not the owner thereof. The technology for user authentication based on the pulse wave may be any one of conventional technologies.

When the user authentication portion 204 verifies that the current user is the owner of the wearable terminal 2, the personal identification information transmission portion 205 sends, as the personal identification information, personal identification data 5D indicating information for identifying the current user to the image forming apparatus 1. In this embodiment, data indicating a user code corresponding to the pulse wave data 5A used by the user authentication portion 204 is sent, as the personal identification data 5D, to the personal identification information obtaining portion 101 of the image forming apparatus 1.

In this way, the personal identification information obtaining portion 101 of the image forming apparatus 1 obtains the personal identification data 5D as the personal identification information.

The user authentication portion 204 and the personal identification information transmission portion 205 perform the processing for user authentication and the processing for sending the personal identification data 5D also when second request data 5F, described later, is received. When the approach notification data 5B is sent from the wearable terminal 2, the identity verification portion 124 performs processing appropriately as discussed later.

The personal identification information transmission portion 205 may encrypt the personal identification data 5D by using a secret key, prepared in advance, of the public key cryptosystem, and send the resultant. In such a case, when receiving the personal identification data 5D, the personal identification information obtaining portion 101 decrypts the personal identification data 5D by using a public key paired with the secret key.

When the personal identification information obtaining portion 101 obtains the personal identification data 5D, the login process portion 102 performs processing for permitting the user of which a user code is indicated in the personal identification data 5D, namely, the current user, to log into the image forming apparatus 1.

As a part of the processing, the login process portion 102 informs the job screen display portion 121 that the current user has logged into the image forming apparatus 1.

In response to the information, the job screen display portion 121 displays a screen in which the current user designates job conditions or gives a command to execute a job on the touch-sensitive panel display 10e in the following manner.

The job screen display portion 121 receives the information from the login process portion 102, and displays a default screen on the touch-sensitive panel display 10e. As the default screen, for example, the menu screen 62 shown in FIG. 8 is displayed on the touch-sensitive panel display 10e.

The job screen display portion 121 displays another screen appropriately in response to operation by the current user. For example, when the current user touches a copy button 62a of the menu screen 62, the job screen display portion 121 displays, instead of the menu screen 62, a copy job screen in which conditions for a copy job are designated and execution of the copy job is instructed. When the current user touches a scan button 62b, the job screen display portion 121 displays, instead of the menu screen 62, a scan job screen in which conditions for a scan job are designated and execution of the scan job is instructed.

The copy job is to scan an image recorded on a sheet to duplicate the scanned image on another sheet. The scan job is to scan an image recorded on a sheet to generate image data thereof, and to save or send the image data.

For execution of the copy job or the scan job, the current user places, in the scanner unit 10i, a sheet on which an image to be copied/scanned is recorded.

In the meantime, the user operates the personal computer 31 to give conditions for a network print job and a command to execute the network print job to the image forming apparatus 1. The mechanism thereof is basically the same as that in conventional technologies. The mechanism is discussed below.

The user logs into the personal computer 31 based on his/her user code. The user prepares data on an image (document) to be printed. For example, he/she prepares such data by creating a document with an application such as a word processing program or a rendering program installed in the personal computer 31. The user opens the document in such an application to enter a print command.

In response to the command, the personal computer 31 causes the printer driver 31P to display a screen (dialog box) in which to designate conditions for the network print job on the liquid crystal display 31e.

The user designates conditions for the network print job on the screen, and gives a command to execute the network print job.

In response to the user operation, the personal computer 31 generates print data 5E used for printing the document based on the prepared data in accordance with the conditions designated by the user. The print data 5E is described in a language supported by the image forming apparatus 1, namely, in Printer Job Language (PJL) or Page Description Language (PDL). At this time, the personal computer 31 makes a record of the user code used for the login in the print data 5E.

The personal computer 31 sends the command for network print job and the print data 5E to the image forming apparatus 1.

The job receiving portion 122 receives the job conditions and the command for job execution. To be specific, the job receiving portion 122 receives them by the following two methods.

According to one of the two methods (hereinafter, referred to as a "first receiving method"), the job receiving portion 122 receives the content of operation performed in the copy job screen or the scan job screen displayed on the touch-sensitive panel display 10e by obtaining a signal indicating a touched location from the touch-sensitive panel display 10e.

According to the other method (hereinafter, referred to as a "second receiving method"), the job receiving portion 122 receives the job conditions and the command for job execution by receiving the print data 5E and a command for network print job from the personal computer 31.

In response to the job conditions and the command for job execution received by the job receiving portion 122, the job execution portion 123 executes the job. However, the job execution portion 123 executes the job only when the identity verification portion 124 confirms that the user who has given the command is close to the image forming apparatus 1. The description goes on to the processing by the identity verification portion 124 and the job execution portion 123.

Where the job receiving portion 122 uses the first receiving method to receive the job conditions and the command for job execution, the identity verification portion 124 attempts to obtain the personal identification information from the wearable terminal 2. At this time, the identity verification portion 124 sends the second request data 5F to the wearable terminal 2.

With the wearable terminal 2, in response to the second request data 5F sent from the image forming apparatus 1, the user authentication portion 204 and the personal identification information transmission portion 205 perform processing for providing, as the personal identification information, the personal identification data 5D to the image forming apparatus 1. The method for providing is the same as that for the case where the first request data 5C is sent to the wearable terminal 2, which is discussed earlier.

The personal identification information transmission portion 205 sends the personal identification data 5D to the identity verification portion 124 of the image forming apparatus 1. It is desirable that, at least, the second request data 5F is sent/received via Bluetooth.

When receiving the personal identification data 5D, the identity verification portion 124 checks a user code indicated in the personal identification data 5D received against the user code of the user who currently logs in the image forming apparatus 1, namely, the user code indicated in the personal identification data 5D obtained most recently by the personal identification information obtaining portion 101. If there is a match therebetween, then the identity verification portion 124 determines that the current user who has given the command is close to the image forming apparatus 1. Where the personal identification data 5D is encrypted, the identity verification portion 124 uses a public key to decrypt the personal identification data 5D.

In contrast, where the job receiving portion 122 uses the second receiving method to receive the job conditions and the command for job execution, the identity verification portion 124 waits for the wearable terminal 2 to send the approach notification data 5B. As described earlier, the approach notification data 5B is sent for the case where the wearable terminal 2 approaches the image forming apparatus 1.

In response to the approach notification data 5B sent from the wearable terminal 2, the identity verification portion 124 transmits the second request data 5F to the wearable terminal 2. In response to the second request data 5F sent from the image forming apparatus 1, the user authentication portion 204 and the personal identification information transmission portion 205 perform processing for providing, as the personal identification information, the personal identification data 5D to the image forming apparatus 1.

When receiving the personal identification data 5D, the identity verification portion 124 checks a user code indicated in the personal identification data 5D received against the user code indicated in the print data 5E for the job (network print job, herein). If there is a match therebetween, then the identity verification portion 124 determines that the user who has given the command, namely, the current user, is close to the image forming apparatus 1.

When the identity verification portion 124 determines that the current user is close to the image forming apparatus 1, the job execution portion 123 executes the job received by the job receiving portion 122.

To be specific, when the job is a copy job, the job execution portion 123 causes the scanner unit 10i to perform processing of optically reading an image recorded on a sheet placed by the current user, and causes the printing unit 10j to perform processing of duplicating (printing) the image read on another sheet.

Alternatively, when the job is a scan job, the job execution portion 123 causes the scanner unit 10i to perform processing of optically reading an image recorded on a sheet placed by the current user to generate image data thereof, and causes the auxiliary storage 10d or the NIC 10g to perform processing of saving or sending the image data generated.

Yet alternatively, when the job is a network print job, the job execution portion 123 causes the printing unit 10j to perform processing of printing an image (document) onto a sheet based on the print data 5E for the job.

After a predetermined amount of time (3 minutes, for example) has elapsed since no operation was made on the touch-sensitive panel display 10e, the logout process portion 103 causes the user currently logging in the image forming apparatus 1, namely, the current user, to log out from the image forming apparatus 1. The logout process portion 103 causes the current user to log out from the image forming apparatus 1 also when he/she performs operation for logout.

The home screen displaying portion 125 displays the login screen 61 (FIG. 3) on the touch-sensitive panel display 10e for the case where the current user logs out from the image forming apparatus 1.

Figure 9:
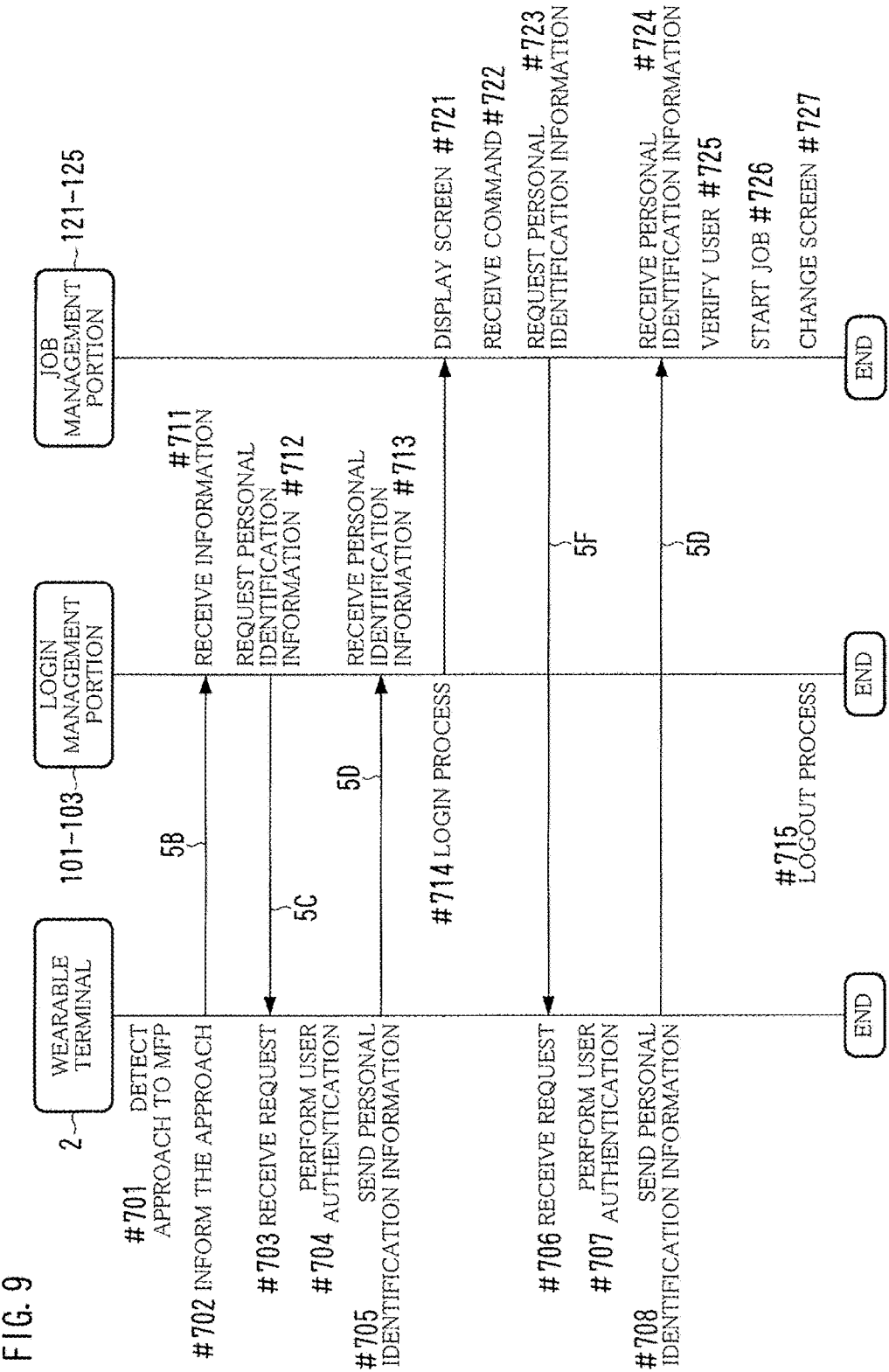
FIG. 9 is a sequence diagram depicting an example of the flow of the processing by the individual devices for the case of a copy job or a scan job.

FIG. 9 is a sequence diagram depicting an example of the flow of the processing by the individual devices for the case of a copy job or a scan job.

The description goes on to the flow of processing by each of the image forming apparatus 1 and the wearable terminal 2 for the case where the user causes the image forming apparatus 1 to execute a copy job. The description is provided with reference to FIG. 9.

The user wears, in advance, the wearable terminal 2 on his/her arm. The user (current user) carries a paper sheet on which a document to be copied is recorded to the installation site of the image forming apparatus 1 in order to cause the image forming apparatus 1 to execute the copy job.

Thereafter, the image forming apparatus 1 and the wearable terminal 2 perform the processing according to the steps as depicted in FIG. 9. The processing by the image forming apparatus 1 is performed based on the wearable login program 10P1 and the job management program 10P2. The processing by the wearable terminal 2 is performed based on the user authentication program 20P.

When detecting the approach to the image forming apparatus 1 (Step #701), the wearable terminal 2 sends the approach notification data 5B to the image forming apparatus 1 (Step #702).

When receiving the approach notification data 5B (Step #711), the image forming apparatus 1 sends the first request data 5C to the wearable terminal 2 to attempt to obtain the personal identification information (Step #712).

When receiving the first request data 5C (Step #703), the wearable terminal 2 measures the current user's pulse wave to analyze the feature of the pulse wave, and checks the feature analyzed against a feature of a pulse wave indicated in the pulse wave data 5A stored in advance. Thereby, the wearable terminal 2 determines whether or not the current user is the same person as the owner of the wearable terminal 2 (Step #704). In short, the wearable terminal 2 performs user authentication.

When determining that the current user is the owner of the wearable terminal 2, the wearable terminal 2 sends the personal identification data 5D to the image forming apparatus 1 (Step #705).

When receiving the personal identification data 5D (Step #713), the image forming apparatus 1 allows the current user to log into the image forming apparatus 1 (Step #714). The image forming apparatus 1 then displays the menu screen 62 (FIG. 8) (Step #721).

The current user places the paper sheet, designates conditions for the copy job, and instructs the image forming apparatus 1 to execute the copy job.

When receiving the designation and the instruction (Step #722), the image forming apparatus 1 attempts to obtain personal identification information by sending the second request data 5F to the wearable terminal 2 (Step #723).

When receiving the second request data 5F (Step #706), the wearable terminal 2 performs user authentication in the same manner as that performed in Step #704 (Step #707). When determining that the current user is the same person as the owner of the wearable terminal 2, the wearable terminal 2 sends the personal identification data 5D to the image forming apparatus 1 (Step #708).

When receiving the personal identification data 5D (Step #724), the image forming apparatus 1 checks a user code indicated in the personal identification data 5D against a user code of the current user. If there is a match therebetween, then the image forming apparatus 1 determines that the current user is close to the image forming apparatus 1 (Step #725). After the determination, the image forming apparatus 1 starts the copy job based on the conditions designated by the current user (Step #726). Where no operation is made for a predetermined period of time, the image forming apparatus 1 displays the login screen 61 (Step #727), and causes the current user to log out therefrom (Step #715).

Where the user instructs a scan job rather than the copy job, the image forming apparatus 1 starts the scan job in Step #726.

Figure 10:
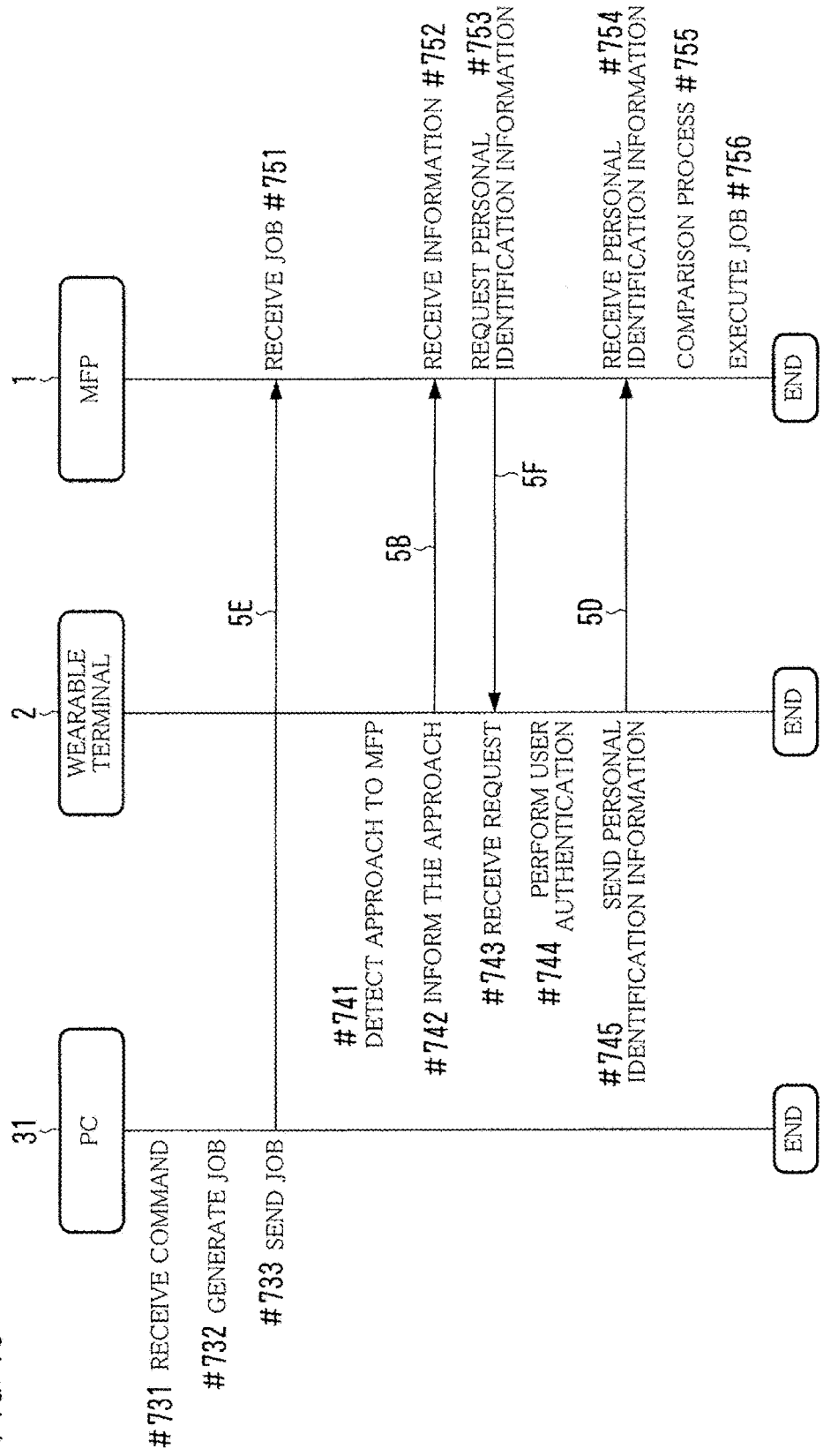
FIG. 10 is a sequence diagram depicting an example of the flow of the processing by the individual devices for the case of a network print job.

FIG. 10 is a sequence diagram depicting an example of the flow of the processing by the individual devices for the case of a network print job.

The description goes on to the flow of the processing by each of the image forming apparatus 1 and the wearable terminal 2 for the case where the user causes the image forming apparatus 1 to execute the network print job. The description is provided with reference to FIG. 10.

The user designates conditions for the network print job on the personal computer 31 to give a command to execute the network print job.

In response to the command, the image forming apparatus 1, the wearable terminal 2, and the personal computer 31 perform processing by the steps of FIG. 10. The processing by the image forming apparatus 1 is performed based on the wearable login program 10P1 and the job management program 10P2. The processing by the wearable terminal 2 is performed based on the user authentication program 20P.

When receiving the designation and the command from the user (Step #731), the personal computer 31 generates print data 5E as data for the network print job (Step #732) to send the print data 5E to the image forming apparatus 1 (Step #733).

The image forming apparatus 1 receives the job through receiving the print data 5E (Step #751).

The user goes to the installation site of the image forming apparatus 1 in order to cause the same to execute the network print job and to receive a printed matter. At this time, the wearable terminal 2 is put in his/her arm.

When detecting the approach to the image forming apparatus 1 (Step #741), the wearable terminal 2 sends the approach notification data 5B to the image forming apparatus 1 (Step #742).

When receiving the approach notification data 5B (Step #752), the image forming apparatus 1 attempts to obtain personal identification information by sending the second request data 5F to the wearable terminal 2 (Step #753).

When receiving the second request data 5F (Step #743), the wearable terminal 2 performs user authentication as with the case of Step #704 of FIG. 9 (Step #744). When determining that the user is the owner of the wearable terminal 2, the wearable terminal 2 sends the personal identification data 5D to the image forming apparatus 1 (Step #745).

When receiving the personal identification data 5D (Step #754), the image forming apparatus 1 checks a user code indicated in the personal identification data 5D against the user code indicated in the print data 5E received in Step #751 (Step #755). If there is a match therebetween, then the image forming apparatus 1 starts the network print job based on the print data 5E (Step #756).

According to this embodiment, the user can log into the image forming apparatus 1 and so on by wearing the wearable terminal 2 in his/her arm. Therefore, the security of the image forming apparatus 1 can be maintained, and the user-friendliness of the image forming apparatus 1 can be improved as compared to conventional technologies.

Figure 11:
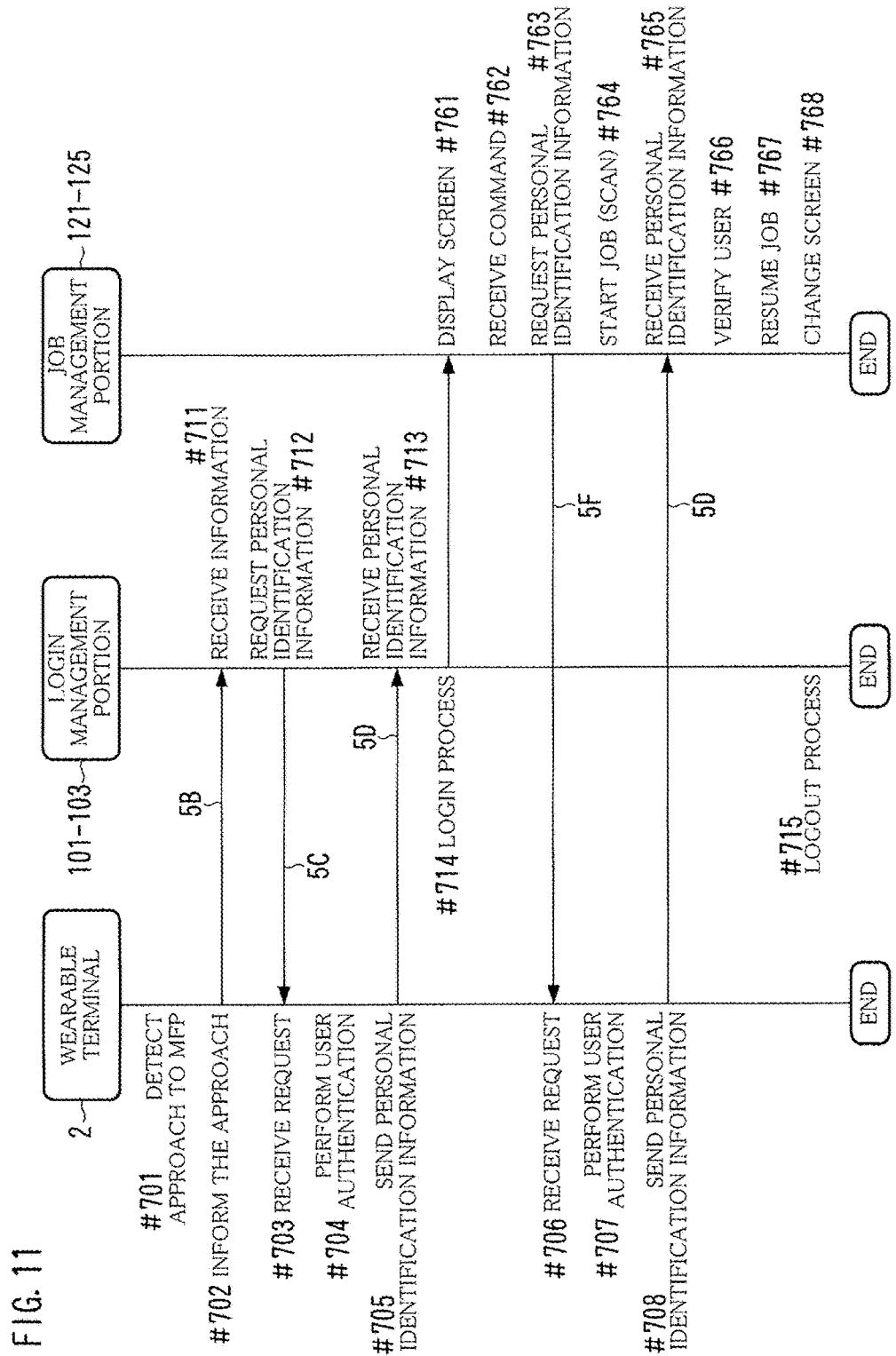
FIG. 11 is a sequence diagram depicting a modification of the flow of the processing by the individual devices for the case of a copy job or a scan job.
Figure 12:
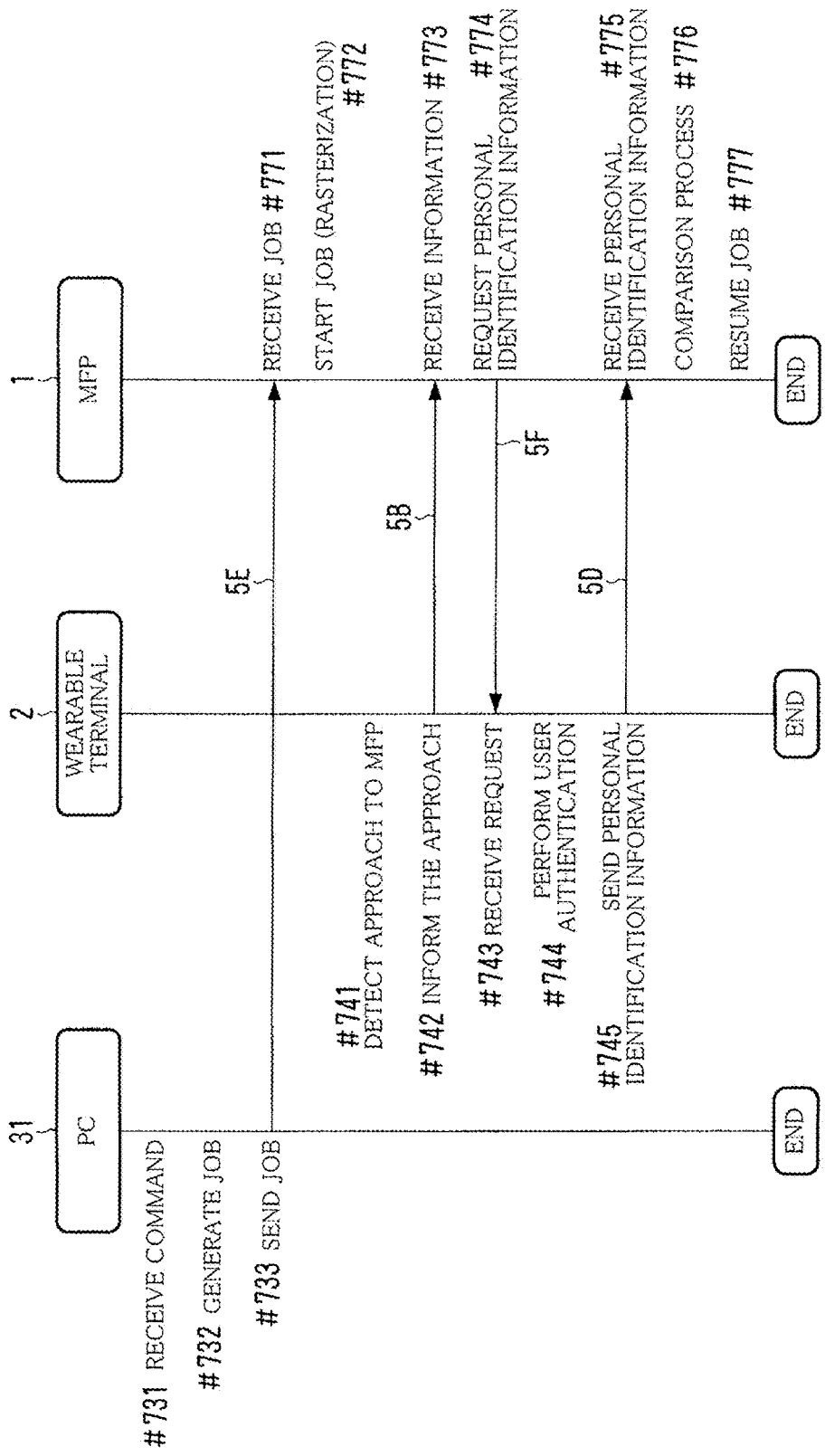
FIG. 12 is a sequence diagram depicting a modification of the flow of the processing by the individual devices for the case of a network print job.
Figure 13:
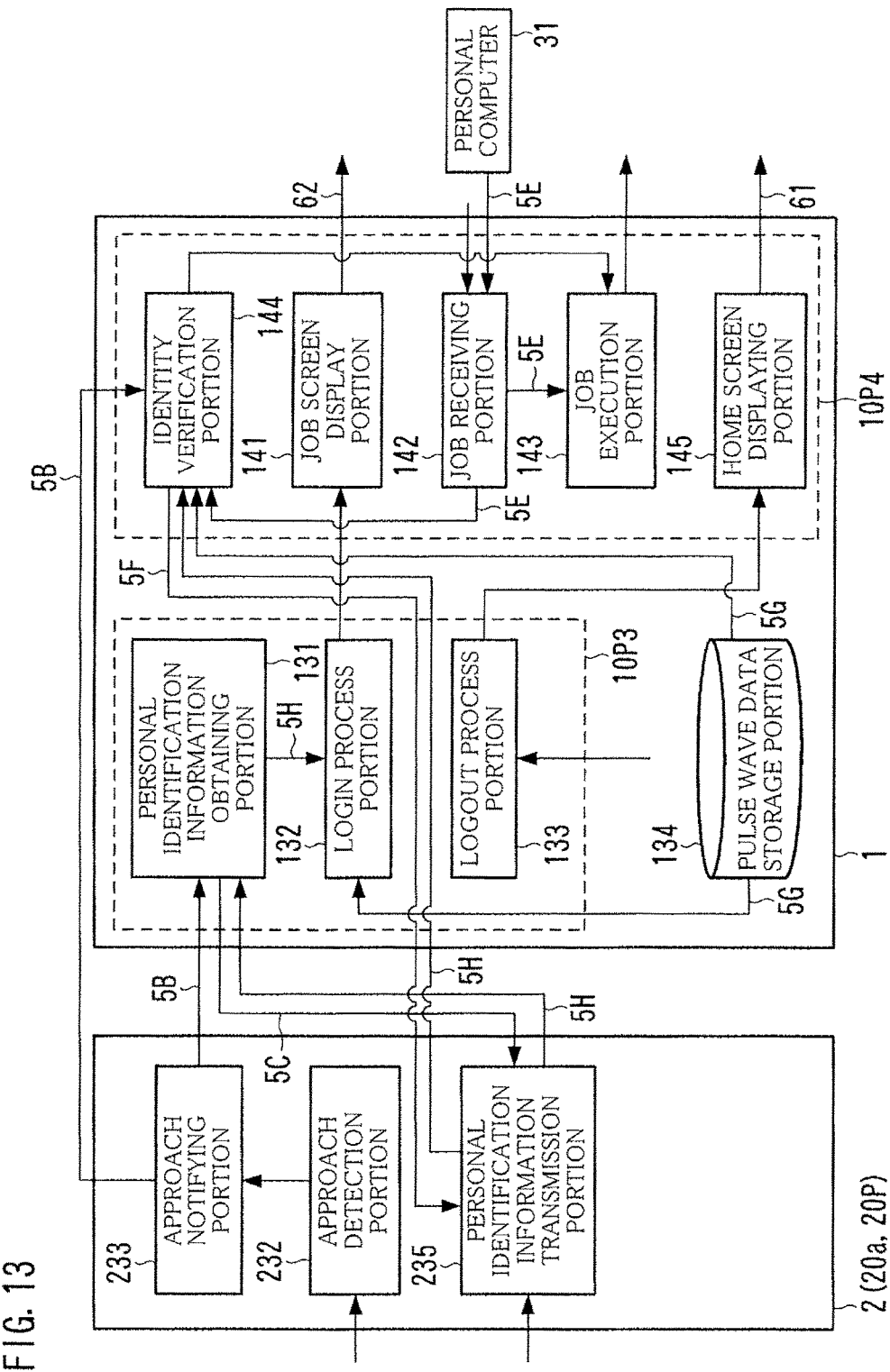
FIG. 13 is a diagram showing a modification of the functional configuration of an image forming apparatus and the functional configuration of a wearable terminal.

FIG. 11 is a sequence diagram depicting a modification of the flow of the processing by the individual devices for the case of a copy job or a scan job. FIG. 12 is a sequence diagram depicting a modification of the flow of the processing by the individual devices for the case of a network print job. FIG. 13 is a diagram showing a modification of the functional configuration of the image forming apparatus 1 and the functional configuration of the wearable terminal 2.

In this embodiment, the job execution portion 123 starts executing a job when the identity verification portion 124 confirms that a user who has given a command to execute the job is close to the image forming apparatus 1. Instead of this, however, the job execution portion 123 may start a part of the processing of the job without waiting for the confirmation by the identity verification portion 124.

The description goes on to the flow of processing for the case where the user gives a command to execute a copy job and the flow of processing for the case where the user gives a command to execute a network print job with reference to FIGS. 11 and 12, respectively.

Referring to FIG. 11, in the case of a copy job given by the user, the processing by the wearable terminal 2 and the processing by the personal identification information obtaining portion 101 through the logout process portion 103 of the image forming apparatus 1 are similar to those depicted in FIG. 9 (Step #701 through Step #708, Step #711 through Step #713). The processing by the job screen display portion 121, the job receiving portion 122, and the identity verification portion 124 (Step #761 through Step #763, Step #765 through Step #766) are similar to that depicted in Step #721 through Step #725 of FIG. 9.

However, when the job receiving portion 122 receives the copy job, the job execution portion 123 starts a part of the copy job in parallel with the processing of sending the second request data 5F by the identity verification portion 124, or before or after the same (Step #764). To be specific, the job execution portion 123 starts scanning paper placed by the user. Suppose that the job execution portion 123 finishes scanning the paper before the identity verification portion 124 confirms that the user who has given the copy job is close to the image forming apparatus 1. In such a case, the job execution portion 123 stops the copy job temporarily and does not proceed to a phase of duplicating an image.

When the identity verification portion 124 confirms that the user is close to the image forming apparatus 1 (Step #766), the job execution portion 123 resumes the copy job (Step #767).

Referring to FIG. 12, in the case of the network print job given by the user, the processing by the wearable terminal 2 and the processing by the personal identification information obtaining portion 101 through the logout process portion 103 of the image forming apparatus 1 are similar to those depicted in FIG. 10 (Step #731 through Step #733, Step #741 through Step #745). The processing by the job receiving portion 122 and the identity verification portion 124 (Step #771, Step #773 through Step #776) is similar to that depicted in Step #751 through Step #755 of FIG. 10.

However, the job execution portion 123 starts a part of the network print job without waiting for the identity verification portion 124 to perform the processing (Step #772). To be specific, the job execution portion 123 starts rasterization. Suppose that the job execution portion 123 finishes scanning the paper before the identity verification portion 124 confirms that the user who has given the network print job is close to the image forming apparatus 1. In such a case, the job execution portion 123 stops the network print job temporarily and does not proceed to a phase of printing an image (document).

When the identity verification portion 124 confirms that the user is close to the image forming apparatus 1 (Step #776), the job execution portion 123 resumes the network print job (Step #777).

Where the image forming apparatus 1 is instructed to execute, instead of the copy job, a fax transmission job of sending a scanned image to a transmission destination, the job execution portion 123 resumes the fax transmission job. To be specific, the job execution portion 123 dials the transmission destination to send the image data to the transmission destination.

As described above, the image forming apparatus 1 may perform a part of the processing up to immediately before the image output processing. Thereafter, the image forming apparatus 1 may resume the remaining processing at a time when the user, who has given the job, approaches the image forming apparatus 1.

In this embodiment, the wearable terminal 2 determines whether or not the current user is the owner of the wearable terminal 2. Instead of the wearable terminal 2, the image forming apparatus 1 may make the determination. In such a case, the image forming apparatus 1 and the wearable terminal 2 may be configured as described below.

In the image forming apparatus 1, a wearable login program 10P3 and a job management program 10P4 are prepared instead of the wearable login program 10P1 and the job management program 10P2, respectively. In the wearable terminal 2, a user authentication program 20P2 is prepared instead of the user authentication program 20P.

The wearable login program 10P3 is a program to implement the functions of a personal identification information obtaining portion 131, a login process portion 132, and a logout process portion 133 shown in FIG. 13. The job management program 10P4 is a program to implement the functions of a job screen display portion 141, a job receiving portion 142, a job execution portion 143, an identity verification portion 144, a home screen displaying portion 145, and so on. In addition to the portions, the auxiliary storage 10d of the image forming apparatus 1 is provided with a pulse wave data storage portion 134. The pulse wave data storage portion 134 may be implemented by the wearable login program 10P3 or by the job management program 10P4.

The user authentication program 20P2 is a program to implement the functions of an approach detection portion 232, an approach notifying portion 233, a personal identification information transmission portion 235, and so on shown in FIG. 13.

Hereinafter, the functions of the individual portions shown in FIG. 13 are described. Descriptions of parts that are identical with those of the functions of the individual portions shown in FIG. 7 are omitted.

With the image forming apparatus 1, the pulse wave data storage portion 134 stores, therein, pulse wave data 5G indicating, for each user, the feature of a pulse wave and a user code.

As with the job screen display portion 121 of FIG. 7, the job screen display portion 141 displays, on the touch-sensitive panel display 10e, a screen in which job conditions and a job command are entered, for example, the menu screen 62 (FIG. 8).

As with the job receiving portion 122, the job receiving portion 142 receives the job conditions and the job command.

As with the logout process portion 103, the logout process portion 133 causes the user to log out from the image forming apparatus 1.

As with the home screen displaying portion 125, the home screen displaying portion 145 displays the login screen 61 (FIG. 3) on the touch-sensitive panel display 10e.

With the wearable terminal 2, the approach detection portion 232 detects the approach of the subject wearable terminal 2 to the image forming apparatus 1 as with the approach detection portion 202.

As with the approach notifying portion 203, the approach notifying portion 233 sends the approach notification data 5B to the image forming apparatus 1 to inform the same that the subject wearable terminal 2 approaches the image forming apparatus 1.

In response to the information, the personal identification information obtaining portion 131 of the image forming apparatus 1 sends the first request data 5C to the wearable terminal 2 to request personal identification information therefrom, and obtains the personal identification information, as with the logout process portion 103.

With the wearable terminal 2, when receiving the first request data 5C, the personal identification information transmission portion 235 causes the pulse wave sensor 20h to perform processing for measuring a pulse wave of the current user to analyze the feature of the pulse wave. In this way, the feature of the pulse wave of the current user is obtained.

The personal identification information transmission portion 235 uses a secret key of the public key cryptosystem to encrypt pulse wave data 5H indicating the feature of the pulse wave and the user code of the current user obtained, and sends the resultant, as the personal identification information, to the personal identification information obtaining portion 131.

With the image forming apparatus 1, when the personal identification information obtaining portion 131 obtains the pulse wave data 5H, the login process portion 132 performs processing for causing the current user to log into the image forming apparatus 1 as described below.

The login process portion 132 uses a public key to decrypt the pulse wave data 5H. The login process portion 132 reads out the pulse wave data 5G indicating the user code contained in the pulse wave data 5H from the pulse wave data storage portion 134. The login process portion 132 checks the feature of the pulse wave indicated in the pulse wave data 5H against the feature of the pulse wave indicated in the pulse wave data 5G, so that it is determined whether or not the current user is the same person as the owner of the wearable terminal 2. The method for determination is the same as that, described earlier, by the user authentication portion 204.

When determining that the current user is the same person as the owner, the login process portion 132 allows the current user to log into the image forming apparatus 1.

The identity verification portion 144 performs processing for confirming that the user who has given a command for job execution is close to the image forming apparatus 1 in the following manner.

Where the job receiving portion 142 receives the job conditions and the command for job execution by using the first receiving method, as with the identity verification portion 124, the identity verification portion 144 sends the second request data 5F to the wearable terminal 2 to attempt to obtain personal identification information from the wearable terminal 2. The second request data 5F is preferably sent via Bluetooth.

With the wearable terminal 2, the personal identification information transmission portion 235 generates pulse wave data 5H to send the same as with the case where the first request data 5C is received. The destination of the pulse wave data 5H is the identity verification portion 144.

Upon receipt of the pulse wave data 5H, the identity verification portion 144 uses the public key to decrypt the pulse wave data 5H. The identity verification portion 144 reads out the pulse wave data 5G indicating the user code contained in the pulse wave data 5H from the pulse wave data storage portion 134. The identity verification portion 144 checks a feature of the pulse wave indicated in the pulse wave data 5H against a feature of the pulse wave indicated in the pulse wave data 5G. If there is a match therebetween, then the identity verification portion 144 determines that the user who has given the command, namely, the current user, is an authorized user. The identity verification portion 144 further checks the user code indicated in the pulse wave data 5H against the user code of the user currently logging in the image forming apparatus 1. If there is a match therebetween, then the identity verification portion 144 determines that the current user is close to the image forming apparatus 1.

In contrast, where the job receiving portion 142 receives the job conditions and the command for job execution by using the second receiving method, the identity verification portion 144 waits for the approach notification data 5B to be sent from the wearable terminal 2.

The identity verification portion 144 receives the approach notification data 5B and sends the second request data 5F to the wearable terminal 2. In response to the transmission, the personal identification information transmission portion 235 generates pulse wave data 5H to send the same to the identity verification portion 144.

As with the case of using the first receiving method, the identity verification portion 144 determines whether or not the current user is an authorized user. The identity verification portion 144 further checks the user code indicated in the pulse wave data 5H against the user code indicated in the print data 5E for the job (network print job in this case). If there is a match therebetween, and further, if it is determined that the current user is an authorized user, then the identity verification portion 144 determines that the current user is close to the image forming apparatus 1.

Where the identity verification portion 144 determines that the current user is close to the image forming apparatus 1, the job execution portion 143 executes the job received by the job receiving portion 142.

In this embodiment, the image forming apparatus 1 sends and receives data directly with the wearable terminal 2. Instead of this, the image forming apparatus 1 may send and receive data with the wearable terminal 2 via the smart phone 32, In such a case, the image forming apparatus 1, the wearable terminal 2, and the smart phone 32 may be configured, for example, as discussed below.

The image forming apparatus 1 transmits data to the smart phone 32 and vice versa through Bluetooth. The wearable terminal 2 transmits data to the smart phone 32 and vice versa through Wi-Fi (wireless LAN). Alternatively, the wearable terminal 2 and the smart phone 32 may be connected to each other via a USB cable and data may be sent and received therebetween via the USB cable.

The approach detection portion 202, the approach notifying portion 203, the user authentication portion 204, and the personal identification information transmission portion 205 shown in FIG. 7 are provided in the smart phone 32 instead of in the wearable terminal 2. The functions of the individual portions are as given above.

Note, however, that the user authentication portion 204 obtains the pulse wave data 5A from the wearable terminal 2 at the time of user authentication processing. Further, the user authentication portion 204 causes the wearable terminal 2 to perform processing for measuring a pulse wave to analyze a feature of the pulse wave. The user authentication portion 204 then obtains the result of processing from the wearable terminal 2.

Alternatively, the approach detection portion 232, the approach notifying portion 233, and the personal identification information transmission portion 235 shown in FIG. 13 are provided in the smart phone 32 instead of in the wearable terminal 2. The functions of the individual portions are as given above.

Note, however, that the personal identification information transmission portion 235 causes the wearable terminal 2 to perform processing for measuring a pulse wave to analyze a feature of the pulse wave. The user authentication portion 204 then obtains the result of processing from the wearable terminal 2.

In this embodiment, every time the wearable terminal 2 receives the first request data 5C or the second request data 5F from the image forming apparatus 1, the wearable terminal 2 measures a pulse wave of the current user to analyze a feature of the pulse wave, and sends the personal identification data 5D or the pulse wave data 5H.

Instead of this, after the analysis, the personal identification data 5D or the pulse wave data 5H may be stored. Suppose that the current user does not detach the wearable terminal 2 from his/her arm, namely, keeps attaching the wearable terminal 2 to the same, and further, that predetermined requirements are satisfied. In such a case, when receiving the first request data 5C or the second request data 5F, the wearable terminal 2 may send the stored result of authentication (personal identification data 5D) or the stored feature of the pulse wave (pulse wave data 5H) without the measurement and analysis.

The predetermined requirements are, for example, that a predetermined amount of time has not yet elapsed since the current user was verified the last time. Another example of the predetermined requirements is that the current user is in a predetermined location, for example, in his/her place of employment. Yet another example of the predetermined requirements is that a security-related level of a job to be executed based on a command given by the current user is equal to or lower than a predetermined level.

In this embodiment, the wearable terminal 2 detects the approach thereof to the image forming apparatus 1. Instead of this, however, the image forming apparatus 1 may detect the approach of the wearable terminal 2 based on a radio marker emitted from the wearable terminal 2. In such a case, it is preferable that, when receiving the radio marker, the image forming apparatus 1 sends the first request data 5C and the second request data 5F to the wearable terminal 2.

The embodiment takes the example where the wearable terminal 2 is a wristwatch-type terminal. The wearable terminal 2 may be a terminal of another type.

For example, the wearable terminal 2 may be a glasses-type terminal. In such a case, a digital camera of the glasses-type terminal preferably photographs iris of eyes instead of a pulse wave, so that user authentication is preferably performed based on the feature of the iris.

Alternatively, a smart phone having a function to read a fingerprint may be used. In such a case, the smart phone is used to read a fingerprint instead of a pulse wave, so that user authentication is preferably performed based on the feature of the fingerprint.

Where a user is not successfully authenticated, the image forming apparatus 1 or the wearable terminal 2 may display an error message indicating that the user is not successfully authenticated.

The wearable login program 10P1 and the job management program 10P2 may be configured to work as one program. The wearable login program 10P3 and the job management program 10P4 may be configured to work as one program.

It is to be understood that the configurations of the image processing system 100, the image forming apparatus 1, the wearable terminal 2, the personal computer 31, the smart phone 32, the constituent elements thereof, the content and order of the processing, the configuration of the data, the configuration of the screens, and the like can be appropriately modified without departing from the spirit of the present invention.

Although the present invention has been described and illustrated in detail, it is clearly understood that the present invention is by way of illustrated and example only and is not to be taken by way of limitation, the scope of the present invention being interpreted by terms of the appended claims.

What is claimed is:

1. An image processing system comprising:
    a terminal configured to be worn by a user for use; and
    an image output apparatus configured to perform an output process for outputting an image in accordance with a command given by the user; wherein
    the terminal includes a hardware processor configured to obtain, from the user, a physical feature of the user,
    any one or both of the terminal and the image output apparatus includes an authentication portion configured to perform, prior to the output process, an authentication process for verifying the user based on the physical feature obtained by the hardware processor, and
    the image output apparatus includes:
    an output process portion configured to perform the output process when the authentication portion verifies the user,
    a display portion configured to display a screen for the user to designate conditions for the output process, and
    wherein the terminal includes
        a detector configured to detect approach of the terminal to the image output apparatus, and
        an informing portion configured to, when the detector detects the approach of the terminal, inform the image output apparatus of the approach of the terminal,
    the image output apparatus includes a request portion configured to, when the image output apparatus is informed of the approach, send the terminal a request to send the physical feature,
    the terminal includes a transmitter configured to, in response to the request, cause the hardware processor to obtain the physical feature to send the physical feature to the image output apparatus, and
    the authentication portion is provided in the image output apparatus, and performs the authentication process based on the physical feature sent by the terminal.

2. The image processing system according to claim 1, wherein
    the image output apparatus includes a login process portion configured to permit the user to log into the image output apparatus when the authentication portion verifies the user, and
    the output process portion performs the output process based on the conditions designated by the user in the screen, and
    the display portion is configured to display the screen for the user to designate conditions for the output process when the user logs in the image output apparatus.

3. The image processing system according to claim 1, wherein the hardware processor obtains the physical feature when the terminal approaches the image output apparatus.

4. The image processing system according to claim 1, wherein, at a time of the request made, if the user has been wearing the terminal since the transmitter sent the physical feature previously, then the transmitter sends, to the image output apparatus, the physical feature previously sent, instead of causing the hardware processor to obtain again the physical feature.

5. The image processing system according to claim 1, wherein, at a time of the request made, if the user has been wearing the terminal since the transmitter sent the physical feature previously and if predetermined requirements are satisfied, then the transmitter sends, to the image output apparatus, the physical feature previously sent, instead of causing the hardware processor to obtain again the physical feature.

6. The image processing system according to claim 1, wherein the hardware processor obtains a pulse wave of the user as the physical feature of the user.

7. An image processing system comprising:
    a terminal configured to be worn by a user for use; and
    an image output apparatus configured to perform an output process for outputting an image in accordance with a command given by the user; wherein
    the terminal includes a hardware processor configured to obtain, from the user, a physical feature of the user,
    any one or both of the terminal and the image output apparatus includes an authentication portion configured to perform, prior to the output process, an authentication process for verifying the user based on the physical feature obtained by the hardware processor, and
    the image output apparatus includes an output process portion configured to perform the output process when the authentication portion verifies the user;
    wherein
    the terminal includes
        a detector configured to detect approach of the terminal to the image output apparatus, and
        an informing portion configured to, when the detector detects the approach of the terminal, inform the image output apparatus of the approach of the terminal,
    the image output apparatus includes a request portion configured to, when the image output apparatus is informed of the approach, send the terminal a request to perform the authentication process, and
    the authentication portion is provided in the terminal, and responds to the request to perform the authentication process to inform the image output apparatus of a result of the authentication process.

8. The image processing system according to claim 7, wherein, at a time of the request made, if the user has been wearing the terminal since the authentication portion performed the authentication process previously, then the authentication portion informs the image output apparatus of a result of the authentication process previously performed, instead of responding to the request to perform the authentication process.

9. The image processing system according to claim 7, wherein, at a time of the request made, if the user has been wearing the terminal since the authentication portion performed the authentication process previously and if predetermined requirements are satisfied, then the authentication portion informs the image output apparatus of a result of the authentication process previously performed, instead of responding to the request to perform the authentication process.

10. An image processing system comprising:
   a terminal configured to be worn by a user for use; and
   an image output apparatus configured to perform an output process for outputting an image in accordance with a command given by the user; wherein
   the terminal includes a hardware processor configured to obtain, from the user, a physical feature of the user,
   any one or both of the terminal and the image output apparatus includes an authentication portion configured to perform, prior to the output process, an authentication process for verifying the user based on the physical feature obtained by the hardware processor, and
   the image output apparatus includes:
      an output process portion configured to perform the output process when the authentication portion verifies the user,
      a display portion configured to display a screen for the user to designate conditions for the output process, and
   wherein
      the output process is included in one job together with another process to be performed prior to the output process, and
      the output process portion performs said another process independently of a result of the authentication process.

11. An image output method for causing an image output apparatus to perform an output process for outputting an image in accordance with a command given by a user, the method comprising:
   allowing the user to wear a terminal;
   causing the terminal to perform an obtaining process for obtaining, from the user, a physical feature of the user;
   causing any one or both of the terminal and the image output apparatus to perform, prior to the output process, an authentication process for verifying the user based on the physical feature obtained;
   designating conditions for the output process by the user using a display portion on the image output apparatus;
   when the user is verified, causing the image output apparatus to perform the output process; and
   wherein the terminal includes
      a detector configured to detect approach of the terminal to the image output apparatus, and
      an informing portion configured to, when the detector detects the approach of the terminal, inform the image output apparatus of the approach of the terminal,
   the image output apparatus includes a request portion configured to, when the image output apparatus is informed of the approach, send the terminal a request to perform the authentication process, and
   the authentication portion is provided in the terminal, and responds to the request to perform the authentication process to inform the image output apparatus of a result of the authentication process.

12. A non-transitory recording medium storing a computer-readable program used in an image output apparatus, the image output apparatus being used together with a terminal worn by a user to obtain a physical feature of the user, the image output apparatus performing an output process for outputting an image in accordance with a command given by the user, the computer-readable program controlling the image output apparatus to perform processing comprising:
   receiving conditions for the output process designated by the user using a display portion on the image output apparatus;
   perform the output process when the user is verified based on the physical feature obtained by the terminal; and
   wherein the terminal includes
      a detector configured to detect approach of the terminal to the image output apparatus, and
      an informing portion configured to, when the detector detects the approach of the terminal, inform the image output apparatus of the approach of the terminal,
   the image output apparatus includes a request portion configured to, when the image output apparatus is informed of the approach, send the terminal a request to perform the authentication process, and
   the authentication portion is provided in the terminal, and responds to the request to perform the authentication process to inform the image output apparatus of a result of the authentication process.

13. An image output method for causing an image output apparatus to perform an output process for outputting an image in accordance with a command given by a user, the method comprising:
   allowing the user to wear a terminal;
   causing the terminal to perform an obtaining process for obtaining, from the user, a physical feature of the user;
   causing any one or both of the terminal and the image output apparatus to perform, prior to the output process, an authentication process for verifying the user based on the physical feature obtained;
   designating conditions for the output process by the user using a display portion on the image output apparatus; and
   when the user is verified, causing the image output apparatus to perform the output process;
   wherein the terminal includes
      a detector configured to detect approach of the terminal to the image output apparatus, and
      an informing portion configured to, when the detector detects the approach of the terminal, inform the image output apparatus of the approach of the terminal,
   the image output apparatus includes a request portion configured to, when the image output apparatus is informed of the approach, send the terminal a request to send the physical feature,
   the terminal includes a transmitter configured to, in response to the request, cause the hardware processor to obtain the physical feature to send the physical feature to the image output apparatus, and
   the authentication portion is provided in the image output apparatus, and performs the authentication process based on the physical feature sent by the terminal.

14. A non-transitory recording medium storing a computer-readable program used in an image output apparatus, the image output apparatus being used together with a terminal worn by a user to obtain a physical feature of the user, the image output apparatus performing an output process for outputting an image in accordance with a command given by the user, the computer-readable program controlling the image output apparatus to perform processing comprising:
- receiving conditions for the output process designated by the user using a display portion on the image output apparatus; and
- perform the output process when the user is verified based on the physical feature obtained by the terminal;
- wherein the terminal includes:
  - a detector configured to detect approach of the terminal to the image output apparatus, and
  - an informing portion configured to, when the detector detects the approach of the terminal, inform the image output apparatus of the approach of the terminal,
- the image output apparatus includes a request portion configured to, when the image output apparatus is informed of the approach, send the terminal a request to send the physical feature,
- the terminal includes a transmitter configured to, in response to the request, cause the hardware processor to obtain the physical feature to send the physical feature to the image output apparatus, and
- the authentication portion is provided in the image output apparatus, and performs the authentication process based on the physical feature sent by the terminal.

* * * * *